(12) United States Patent
Oelerich et al.

(10) Patent No.: US 8,672,358 B2
(45) Date of Patent: Mar. 18, 2014

(54) HIGH PRESSURE VESSEL WITH INTEGRATED MOUNTING FEATURES

(75) Inventors: Wolfgang Oelerich, Wiesbaden (DE); Bryan J. Stewart, New Hudson, MI (US); Mohsen D. Shabana, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 352 days.

(21) Appl. No.: 12/638,482

(22) Filed: Dec. 15, 2009

(65) Prior Publication Data

US 2011/0143222 A1    Jun. 16, 2011

(51) Int. Cl.
*B65D 88/50*    (2006.01)
(52) U.S. Cl.
USPC ........................................................ 280/830
(58) Field of Classification Search
None
See application file for complete search history.

(56) References Cited

U.S. PATENT DOCUMENTS

| 5,470,207 | A | 11/1995 | Shockey et al. |
| 6,708,719 | B2 | 3/2004 | Idoguchi |
| 7,270,209 | B2 | 9/2007 | Suess |
| 7,744,127 | B2 * | 6/2010 | Essinger et al. ............. 280/830 |
| 2009/0309000 | A1 * | 12/2009 | Guckes ..................... 248/309.1 |

FOREIGN PATENT DOCUMENTS

CN    1488056 A    4/2004

* cited by examiner

*Primary Examiner* — Patrick Ryan
*Assistant Examiner* — Wyatt McConnell
(74) *Attorney, Agent, or Firm* — Fraser Clemens Martin & Miller LLC; J. Douglas Miller

(57) ABSTRACT

A mounting system for a pressure vessel is disclosed. The mounting system includes a first retention cap, a second retention cap, and a plurality of fastening bands coupled to the first retention cap and the second retention cap, wherein the first retention cap and the second retention cap each include a concave inner surface and a mount, the concave inner surface substantially corresponding to at least a portion of an exterior surface of the pressure vessel to secure the pressure vessel between the first retention cap and the second retention cap.

19 Claims, 3 Drawing Sheets

HIGH PRESSURE VESSEL WITH INTEGRATED MOUNTING FEATURES

FIELD OF THE INVENTION

The invention relates to pressure vessels, and more particularly to a mounting system for a pressure vessel including a retention cap and a fastening band.

BACKGROUND OF THE INVENTION

Fuel cells have been proposed as a power source for electric vehicles and other applications. In proton exchange membrane (PEM) type fuel cells, hydrogen is supplied as a fuel to an anode of the fuel cell and oxygen is supplied as an oxidant to a cathode of the fuel cell. A plurality of fuel cells is stacked together in fuel cell stacks to form a fuel cell system. The fuel is typically stored in large, hollow, substantially cylindrical pressure vessels disposed on an undercarriage of the vehicle.

The pressure vessels are typically multi-layered and include at least an inner liner and a filament wound outer shell. The pressure vessels may expand or contract when a pressure and a temperature of the fuel within the vessels changes. A restraining means disposed on the pressure vessels must be able to accommodate the expansion and the contraction of the pressure vessels.

To provide the vehicle with a desired travel range and a vehicle appearance consistent with consumer needs, a plurality of the pressure vessels is required. A diameter of the pressure vessels may be limited by a package space adjacent the undercarriage of the vehicle or by a conventional restraining means used to secure the pressure vessels. Accordingly, a length of the pressure vessels may be increased to compensate for the limited diameter or to facilitate the conventional restraining means. As the length of the pressure vessels increases, a ratio of the diameter to the length decreases. The conventional restraining means (typically including a plurality of circumferential bands fastened to a support structure) may be of considerable size and restrict service of the pressure vessels. The pressure vessel having a small diameter to length ratio makes inefficient use of the package space and facilitates the use of conventional restraining means.

The plurality of pressure vessels and associated componentry results in an increased mass of the fuel cell system into which the pressure vessels are incorporated. The pressure vessel may require a regulating valve, a pressure sensor, a pressure relief device, a restraining means, or other devices. As a result, the cost and the mass of the fuel cell system including the plurality of the pressure vessels may become undesirably high.

It would be desirable to develop a mounting system that permits a repeated expansion and contraction of the pressure vessel, restrains the vessel having a large diameter to length ratio, and minimizes a mass of a system into which the pressure vessel is incorporated.

SUMMARY OF THE INVENTION

Presently provided by the invention, a mounting system that permits a repeated expansion and contraction of the pressure vessel, restrains the vessel having a large diameter to length ratio, and minimizes mass of the system into which the pressure vessel is incorporated, has surprisingly been discovered.

In one embodiment, a mounting system for a pressure vessel comprises a retention cap having an inner surface adapted to receive at least a portion of an exterior surface of the pressure vessel, the retention cap including a mount disposed thereon adapted to be coupled to a mounting structure, at least one fastening band disposed on the retention cap to facilitate a securing of the retention cap, and a resilient mount disposed on the retention cap adapted to facilitate an expansion and a contraction of the pressure vessel.

In a second embodiment, a mounting system for a pressure vessel comprises a first retention cap having a first inner surface adapted to receive at least a portion of an exterior surface of the pressure vessel, the retention cap including a first mount disposed thereon adapted to be coupled to a mounting structure, a second retention cap having a second inner surface adapted to receive at least a portion of the exterior surface of the pressure vessel, the retention cap including a second mount disposed thereon adapted to be coupled to the mounting structure, a plurality of fastening bands, wherein a first portion of the plurality of fastening bands is coupled to the first retention cap and a remaining portion of the plurality of fastening bands is coupled to the second retention cap, the first portion of the plurality of fastening bands releasably coupled to one of the first retention cap, the second retention cap, and the remaining portion, a first resilient mount disposed on the first retention cap adapted to facilitate an expansion and a contraction of the pressure vessel, and a second resilient mount disposed on the second retention cap adapted to facilitate the expansion and the contraction of the pressure vessel.

In another embodiment, a storage system for a fluid comprises a pressure vessel having an exterior surface and a vessel opening, the vessel opening formed in the exterior surface, the exterior surface defining an interior of the pressure vessel, a first retention cap having a first inner surface adapted to receive at least a portion of an exterior surface of the pressure vessel, the retention cap including a first plurality of mounts disposed thereon, a second retention cap having a second inner surface adapted to receive at least a portion of the exterior surface of the pressure vessel, the retention cap including a second plurality of mounts disposed thereon, a plurality of fastening bands, wherein a first portion of the plurality of fastening bands is coupled to the first retention cap and a remaining portion of the plurality of fastening bands is coupled to the second retention cap, the first portion of the plurality of fastening bands releasably coupled to one of the first retention cap, the second retention cap, and the remaining portion, a plurality of first resilient mounts disposed on the first retention cap adapted to facilitate an expansion and a contraction of the pressure vessel, a plurality of second resilient mounts disposed on the second retention cap adapted to facilitate the expansion and the contraction of the pressure vessel, a mounting structure coupled to at least one of the first retention cap and the second retention cap, the mounting structure having a plurality of receiving elements, the receiving elements corresponding to at least a portion of one of the first plurality of mounts and the second plurality of mounts, and a fluid distribution body, the distribution body disposed adjacent the pressure vessel and in fluid communication with the interior.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
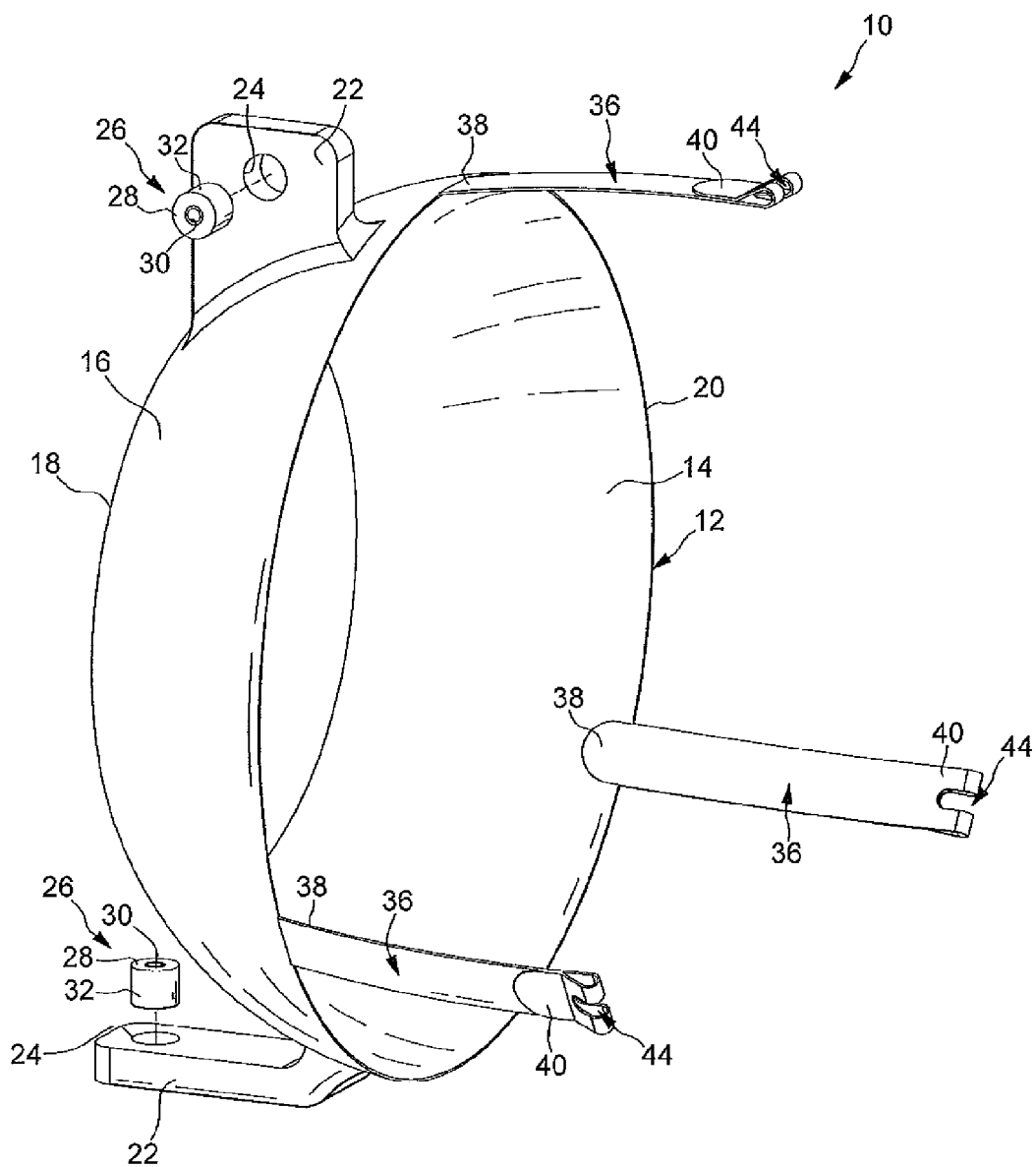
FIG. 1 is a perspective view of a mounting system for a pressure vessel including a retention cap and a fastening band according to an embodiment of the present invention.

FIG. 1 illustrates a mounting system 10 including a retention cap 12 according to an embodiment of the present invention. The retention cap 12 is typically formed from steel, but other materials such as aluminum, magnesium, other metals, or a composite material may be used. As illustrated, the retention cap 12 is a truncated hollow conoid, but other shapes such as a hollow hemisphere or a hollow prism may be used. The retention cap 12 has a concave inner surface 14 and an outer surface 16. A thickness of the retention cap 12 separating the concave inner surface 14 and the outer surface 16 is substantially constant, but the thickness may vary in other embodiments. The retention cap 12 includes an access aperture 18 defining a first end thereof. An entry aperture 20 defines a second end of the retention cap 12.

At least one mount 22 is disposed on the outer surface 16 of the retention cap 12. In the embodiment shown, two mounts 22 are integrally formed with the retention cap 12, but the mounts 22 may be formed separate from the retention cap 12 and attached by any conventional means such as with fasteners or an adhesive. Steel is typically used to form the mount 22, but other materials such as aluminum or a composite may be used. A retaining aperture 24 is formed in the mount 22.

A resilient mount 26 is disposed in the retaining aperture 24. For clarity, FIG. 1 shows the resilient mount 26 removed from the retaining aperture 24. The resilient mount 26 includes a main body 28 and a bushing 30. The main body 28 may be formed from an elastomeric material, a viscoelastic material, or other resilient material. The resilient mount may also be a biasing member mount, wherein the main body 28 or a biasing member 32 is disposed between the bushing 30 and a remaining portion of the biasing member mount. The main body 28 has an outer diameter substantially corresponding to a diameter of the retaining aperture 24. A length of the main body 28 is substantially equal to a thickness of the mount 22, although other lengths may be used. Other resilient mounts such as a multiple piece mount, a flared mount, a bobbin mount, or other resilient mounts may also be used. The bushing 30 is a tube formed from a metal or other rigid material. An outer diameter of the bushing 30 substantially corresponds to an inner diameter of the main body 28 or the biasing member 32. The bushing 30 is disposed in the resilient mount 26 and may be secured by a friction fit, an adhesive, or other fastening means.

An annular array of fastening bands 36 is shown in FIG. 1 coupled to the retention cap 12. It is understood any number of fastening bands 36 may be used. The fastening band 36 is an elongate member formed from a sheet metal or other substantially non-elastic material. The fastening band 36 has a mounting end 38 and a coupling end 40. The mounting end 38 is coupled to the retention cap 12 by any suitable means such as welding, an adhesive, a fastener, and the like. When the retention cap 12 and the fastening band 36 are formed from a similar material, the fastening band 36 may be integrally formed with the retention cap 12. A coupling aperture is formed in the coupling end 40. The coupling end 40 is formed into a substantially "J" shaped hook and coupled to the fastening band 36. The coupling aperture folded over results in a coupling slot 44. The coupling end 40 may be secured to the fastening band 36 by a weld, an adhesive, or other means. The coupling end 40 may be any coupling end for engaging a fastener. Further, in other embodiments of the invention, the coupling end 40 may also be a mounting end coupled to a retention cap (not shown) spaced apart from the retention cap 12 by any suitable means such as welding, an adhesive, a fastener, and the like.

Figure 2:
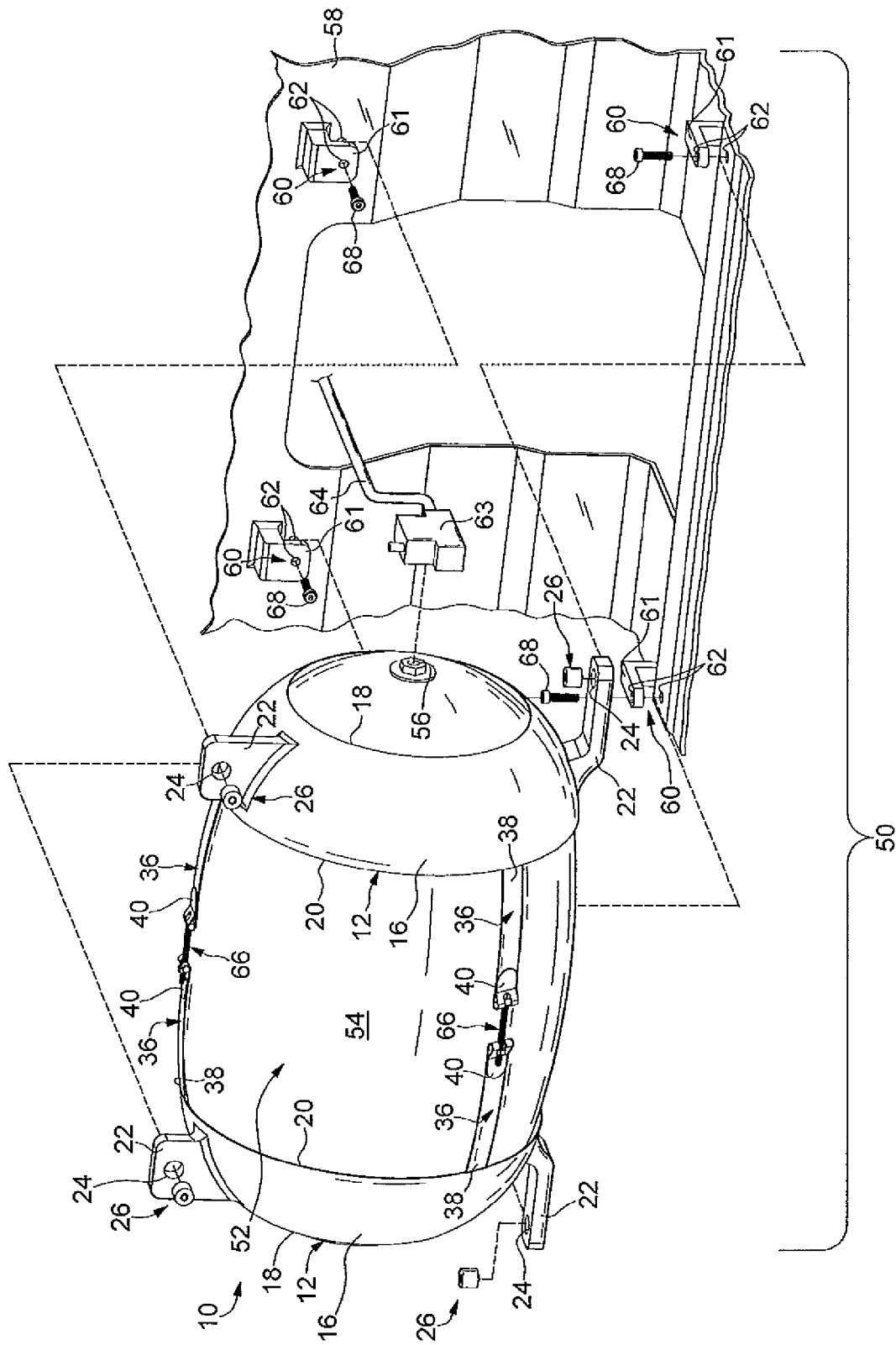
FIG. 2 is a partially exploded perspective view of a storage system including the mounting system illustrated in FIG. 1.

FIG. 2 illustrates a storage system 50 according to an embodiment of the present invention. The storage system 50 includes a pressure vessel 52. The pressure vessel 52 typically includes an inner liner and a wound outer shell having an exterior surface 54. The wound outer shell is typically formed with a filament winding process and may be formed from any conventional material such as a carbon fiber, a glass fiber, a composite fiber, and a fiber having a resin coating. Alternately, the wound outer shell may also be formed from any moldable material such as a metal and a plastic. A vessel opening 56 is typically formed at an end of the pressure vessel 52 and provides an attachment point for various fixtures and utility devices that may be attached to the pressure vessel 52.

A mounting structure 58 includes a plurality of receiving elements 60. The receiving elements 60 include a mounting tab 61 and a fastening aperture 62. A portion of a vehicle undercarriage typically includes the mounting structure 58 formed thereon, but any structure suitable for mounting the pressure vessel 52 may be used. The mounting tab 61 is disposed on the mounting structure and the mount 22 is disposed therebetween. The mounting tab 61 is substantially "L" shaped, but any shape may be used. Alternately, the mount 22 may be disposed in an aperture formed in the mounting structure 58. The fastening aperture 62 is at least one circular aperture formed in one of the mounting tab 61 and the mounting structure 58. As illustrated, the fastening aperture 62 is formed in the mounting tab 61 and the mounting structure 58, a portion of the fastening aperture 62 formed in the mounting structure 58 including a threaded portion formed therearound.

A distribution body 63 for a fluid is illustrated in FIG. 2. The distribution body 63 is in fluid communication with the vessel opening 56 and an interior of the pressure vessel 52. Typically formed from a machined metal such as steel or aluminum, the distribution body 63 may be configured for a variety of uses. A conduit 64 is in fluid communication with the distribution body 63 to facilitate transfer of the fluid to or from the interior of the pressure vessel 52. A valve, a pressure relief device, a sensor, a coupler, or other device may also be disposed on the distribution body 63 in fluid communication with one of the distribution body 63 and the conduit 64.

The storage system 50 is shown assembled in FIG. 2. Two retention caps 12 are disposed on opposing ends of the pressure vessel 52, the concave inner surface 14 of each retention cap 12 abutting the exterior surface 54 of the pressure vessel 52. As shown, the vessel opening 56 protrudes through the access aperture 18 of the retention cap 12.

The fastening bands 36 of each of the retention caps 12 are coupled with a fastening element 66. The fastening element 66 includes a threaded central portion, a first retention cylinder, a second retention cylinder, and a nut. The first retention cylinder is disposed in the coupling end 40 of the fastening band 36. A threaded section formed therein is substantially aligned with the coupling slot 44. The threaded central portion is disposed in the coupling slot 44 and secured to the first retention cylinder by engagement with the threaded section thereof. The second retention cylinder is disposed in the coupling end 40 of the fastening band 36 opposite the fastening band 36 including the first retention cylinder. An aperture is formed in the second retention cylinder and is substantially aligned with the coupling slot 44. The threaded central portion is then disposed in the aperture of the second retention cylinder. The nut is then disposed on the threaded central portion, to engage the thread formed thereon. A rotation of the nut causes the nut to travel along a length of the threaded central portion, drawing the second retention cylinder towards the first retention cylinder. As a result, the fastening band 36 is drawn tight, resulting in the retention caps 12 applying a compressive force to the pressure vessel 52. Other coupling devices may be used to couple the fastening bands 36. A tension of the fastening bands 36 may be adjusted during assembly of the storage system 50 to accommodate for an expansion or a contraction of the pressure vessel 52.

The pressure vessel 52 including the retention caps 12 is coupled to the mounting structure 58. The resilient mounts 26 are disposed in each of the retaining apertures 24. The mounts 20 of the retention caps 12 are disposed between the mounting tabs 61 and the mounting structure 58. The bushings 30 of the resilient mount 26 are aligned with the fastening apertures 62. A fastener 68 having a thread formed thereon is disposed through the mounting tab 61 and the bushing 30 of the resilient mount 26, engaging the threaded portion of the mounting structure 58. Other fasteners such as a pin, a rivet, and the like may also be used. The fastener 68 is then tightened, securing the pressure vessel 52 including the retention caps 12 to the mounting structure 58.

Figure 3:
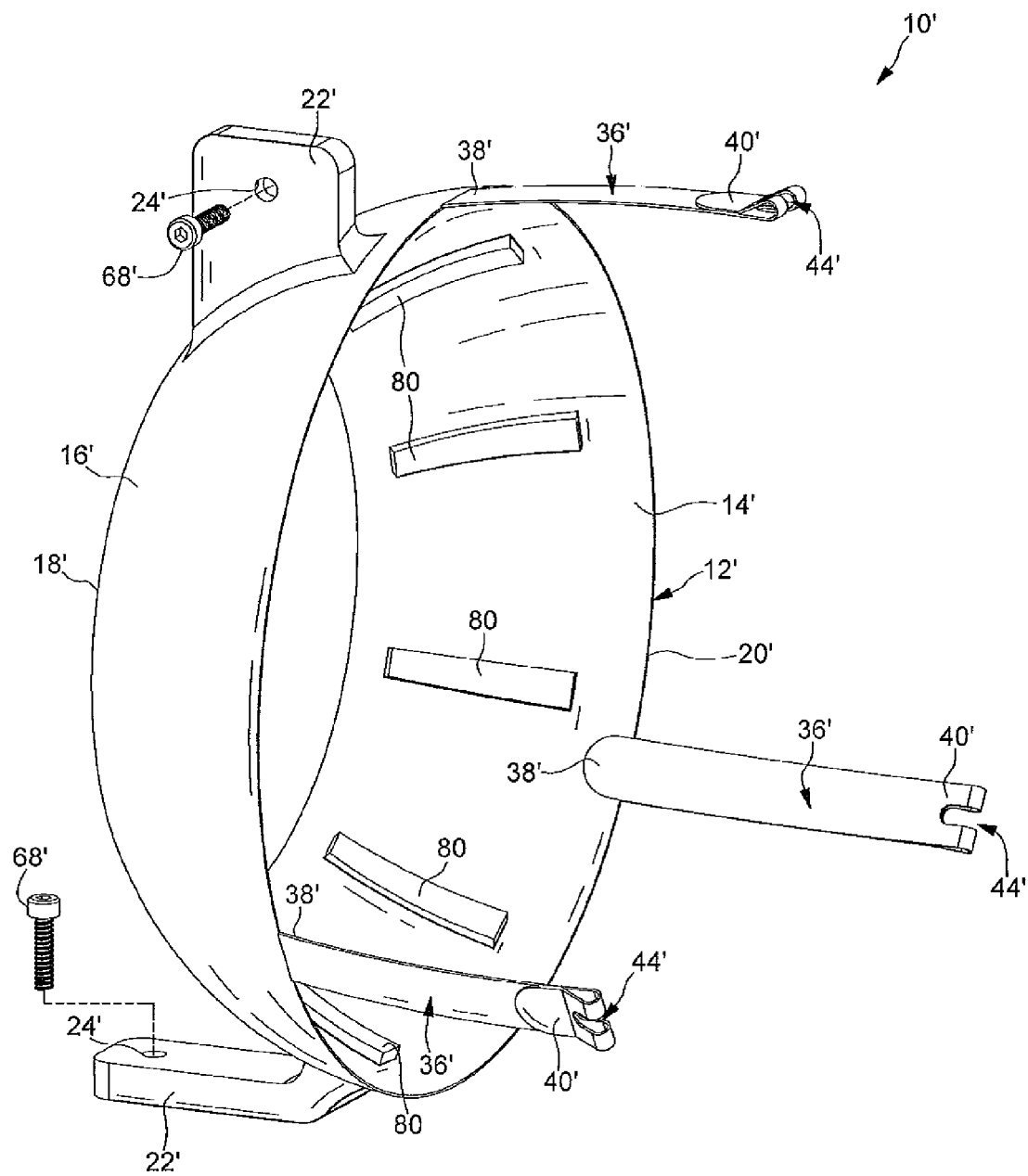
FIG. 3 is a perspective view of a mounting system for a pressure vessel including a retention cap and a fastening band according to another embodiment of the invention.

FIG. 3 shows another embodiment of the invention similar to that shown in FIG. 1. Reference numerals for similar structure in respect of the description of FIG. 1 are repeated in FIG. 3 with a prime (') symbol.

The mounting system 10' includes at least one resilient mount 80 disposed on the concave inner surface 14'. The resilient mount 80 shown is substantially rectangular in shape and may be formed from a resilient material such as a high density foam or a rubber. However, the resilient mount 80 may be any shape and any quantity may be used. An adhesive is used to secure the resilient mount 80 to the concave inner surface 14', although other fastening means may be used. The adhesive is applied to a contact side of the resilient mount 80 and disposed on the concave inner surface 14'. The mounting system 10' is rigidly affixed to a mounting structure (not shown). The fastener 68' is disposed in the retaining aperture 24' through the mount 22' without the use of the resilient mount 26.

In use, the mounting system 10, 10' permits the pressure vessel 52 to expand and contract in response to changes in a pressure and a temperature of the fluid therein. For example, a high pressure and temperature of the fluid causes the pressure vessel 52 to increase in size to an expanded state.

In the mounting system 10, as the pressure vessel 52 expands the retention cap 12 may be displaced by the pressure vessel 52. As a result, the main body 28 of the resilient mount 26 is compressed in a direction the pressure vessel 52 expands. The diameter of the main body 28, a location and quantity of the mounts 22, and an orientation of the mounts 22 may be adjusted to accommodate the expansion of the pressure vessel 52. Conversely, a low pressure and temperature of the fluid within the pressure vessel 52 causes the pressure vessel 52 to contract in size from the expanded state. The mounting system 10 may be similarly adapted for contraction of the pressure vessel 52 from the expanded state.

In the mounting system 10', as the pressure vessel 52 expands, the retention cap 12' remains rigidly affixed to the mounting structure. As a result, the resilient mounts 80 disposed on the concave inner surface 14' are compressed in a direction the pressure vessel 52 expands. A thickness of the resilient mounts 80 and a location and quantity of the resilient mounts 80 may be adjusted to accommodate the expansion of the pressure vessel 52. Conversely, a low pressure and temperature of the fluid within the pressure vessel 52 causes the pressure vessel 52 to contract in size from the expanded state. The resilient mounts 80 may be similarly adapted for contraction of the pressure vessel 52 from the expanded state.

The storage system 50 including the mounting system 10, 10' restrains the pressure vessel 52 having a large diameter to length ratio while facilitating service the pressure vessel 52 may require. As a result, a size of the pressure vessel 52 may be increased, providing a greater travel range to a vehicle the storage system 50 is incorporated in and minimizing a need for a storage system including a plurality of pressure vessels.

The storage system 50 in accord with the present disclosure minimizes a mass of the vehicle the storage system 50 is included in by minimizing the need for the plurality of pressure vessels and any componentry associated therewith. As a result, the vehicle having the storage system 50 may be more efficient while facilitating manufacture of the vehicle.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A mounting system for a pressure vessel, the system comprising:
   a first retention cap having an inner surface to receive at least a portion of an exterior surface of the pressure vessel, the first retention cap including a mount disposed thereon for coupling to a mounting structure;
   at least one elongate fastening band disposed on the first retention cap to facilitate a coupling of the first retention cap, the at least one fastening band having a mounting end at a first longitudinal end thereof and a coupling end at a second longitudinal end thereof, the mounting end coupled to the first retention cap and the coupling end projecting away from the first retention cap; wherein the at least one elongate fastening band is configured to be substantially parallel to a longitudinal axis of the pressure vessel; and
   a resilient mount disposed on the first retention cap to facilitate an expansion and a contraction of the pressure vessel, wherein the resilient mount is disposed according to one of:
     in an aperture formed in the mount, wherein the resilient mount includes a main body and a bushing disposed therein; and
     on the inner surface of the first retention cap.

2. The mounting system according to claim 1, wherein the main body is mounted on the bushing to facilitate retention of the bushing within the aperture of the mount.

3. The mounting system according to claim 1, wherein the main body of the resilient mount is formed from one of an elastomeric material and a viscoelastic material.

4. The mounting system according to claim 1, wherein the fastening band is integrally formed with the first retention cap.

5. The mounting system according to claim 1, further comprising a second retention cap, wherein the at least one elongate fastening band couples the first retention cap to the second retention cap.

6. The mounting system according to claim 1, wherein the first retention cap includes a concave inner surface between an access aperture and an entry aperture, the concave inner surface substantially corresponding to at least a portion of an exterior surface of the pressure vessel.

7. The mounting system according to claim 1, further comprising a second retention cap having an inner surface to receive at least a portion of the exterior surface of the pressure vessel.

8. The mounting system according to claim 7, wherein at least one of the first retention cap and the second retention cap has a substantially constant thickness.

9. The mounting system according to claim 7, wherein at least one of the first retention cap and the second retention cap includes a plurality of mounts disposed thereon.

10. The mounting system according to claim 7, further comprising at least one fastening band disposed on the second retention cap.

11. The mounting system according to claim 10, wherein at least one fastening band of the second retention cap cooperates with the at least one fastening band of the first retention cap to secure the pressure vessel between the first retention cap and the second retention cap.

12. A mounting system for a pressure vessel, the system comprising:
   a first retention cap having a first inner surface adapted to receive at least a portion of an exterior surface of the pressure vessel, the retention cap including a first mount disposed thereon adapted to be coupled to a mounting structure;
   a second retention cap having a second inner surface adapted to receive at least a portion of the exterior surface of the pressure vessel, the retention cap including a second mount disposed thereon adapted to be coupled to the mounting structure;
   a plurality of fastening bands, wherein the first portion of the plurality of fastening bands is coupled to the first retention cap and a remaining portion of the plurality of fastening bands is coupled to the second retention cap, the first portion of the plurality of fastening bands releasably coupled to one of the first retention cap, the second retention cap, and the remaining portion;
   a first resilient mount disposed on the first retention cap adapted to facilitate an expansion and a contraction of the pressure vessel; and
   a second resilient mount disposed on the second retention cap adapted to facilitate the expansion and the contraction of the pressure vessel.

13. The mounting system according to claim 12, wherein the first retention cap and the second retention cap have a substantially constant thickness.

14. The mounting system according to claim 12, wherein the first retention cap includes a first plurality of mounts disposed thereon and the second retention cap includes a second plurality of mounts disposed thereon.

15. The mounting system according to claim 12, wherein the first resilient mounts is disposed in an aperture formed in the first mounts and the second resilient mount is disposed in an aperture formed in the second mount.

16. The mounting system according to claim 12, wherein the first resilient is disposed on the first inner surface of the first retention cap and the second resilient mount is disposed on the second inner surface of the second retention.

17. The mounting system according to claim 12, wherein one of the first resilient mount and the second resilient mount is formed from one of an elastomeric material and a viscoelastic material.

18. The mounting system according to claim 12, wherein one of the first retention cap and the second cap is formed from one of a metal and a composite material.

19. A storage system for a fluid, the storage system comprising:
   a pressure vessel having an exterior surface and a vessel opening, the vessel opening formed in the exterior surface, the exterior surface defining an interior of the pressure vessel;
   a first retention cap having a first inner surface adapted to receive at least a portion of an exterior surface of the pressure vessel, the retention cap including a first plurality of mounts disposed thereon;
   a second retention cap having a second inner surface adapted to receive at least a portion of the exterior surface of the pressure vessel, the retention cap including a second plurality of mounts disposed thereon;
   a plurality of elongate fastening bands, wherein a first portion of the plurality of fastening bands is coupled to the first retention cap and a remaining portion of the plurality of fastening bands is coupled to a second retention cap, the first portion of the plurality of fastening bands releasably coupled to one of the first retention cap, the second retention cap, and the remaining portion;
   a plurality of first resilient mounts disposed on the first retention cap adapted to facilitate the expansion and the contraction of the pressure vessel;
   a mounting structure coupled to at least one of the first retention cap and the second retention cap, the mounting structure having a plurality of receiving elements, the receiving elements corresponding to at least a portion of one of the first plurality of mounts and the second plurality of mounts; and
   a fluid distribution body disposed adjacent the pressure vessel and in fluid communication with the interior.

* * * * *